Sept. 25, 1956  J. O. CREEK ET AL  2,763,934
GAUGE APPARATUS

Filed July 14, 1955  3 Sheets-Sheet 1

INVENTORS
J. O. CREEK - E. W. DAWSON
BY Maybee & Legris
ATT'YS

Sept. 25, 1956   J. O. CREEK ET AL   2,763,934
GAUGE APPARATUS

Filed July 14, 1955   3 Sheets-Sheet 3

INVENTORS
J.O. CREEK
E.W. DAWSON

BY: Maybee & Legris
ATT'YS

United States Patent Office 2,763,934
Patented Sept. 25, 1956

2,763,934

GAUGE APPARATUS

John Oliver Creek, Brampton, Ontario, and Edward William Dawson, Toronto, Ontario, Canada, assignors to A. V. Roe Canada Limited, Malton, Ontario, Canada, a corporation Application July 14, 1955, Serial No. 522,150

8 Claims. (Cl. 33—147)

This is a continuation-in-part of United States of America patent application Ser. No. 231,136 filed June 12, 1951, now Patent 2,714,765, dated August 9, 1955. This invention relates to gauge apparatus and the object of the invention is to provide apparatus that will accurately gauge workpieces having irregular or non-geometric surfaces.

This object is attained by providing resilient means for constantly urging the gauge device to maintain the fixed anvil in contact with one of the sides of the object to be gauged.

A further object is to provide means for recording the deviation of the surface of the specimen from its centre plane.

This is achieved by means of a gauge device to indicate position of the anvil which engages the under surface of the specimen at the various gauging stations.

The invention is hereafter more particularly described and is illustrated in the accompanying drawings in which.

Figure 1:
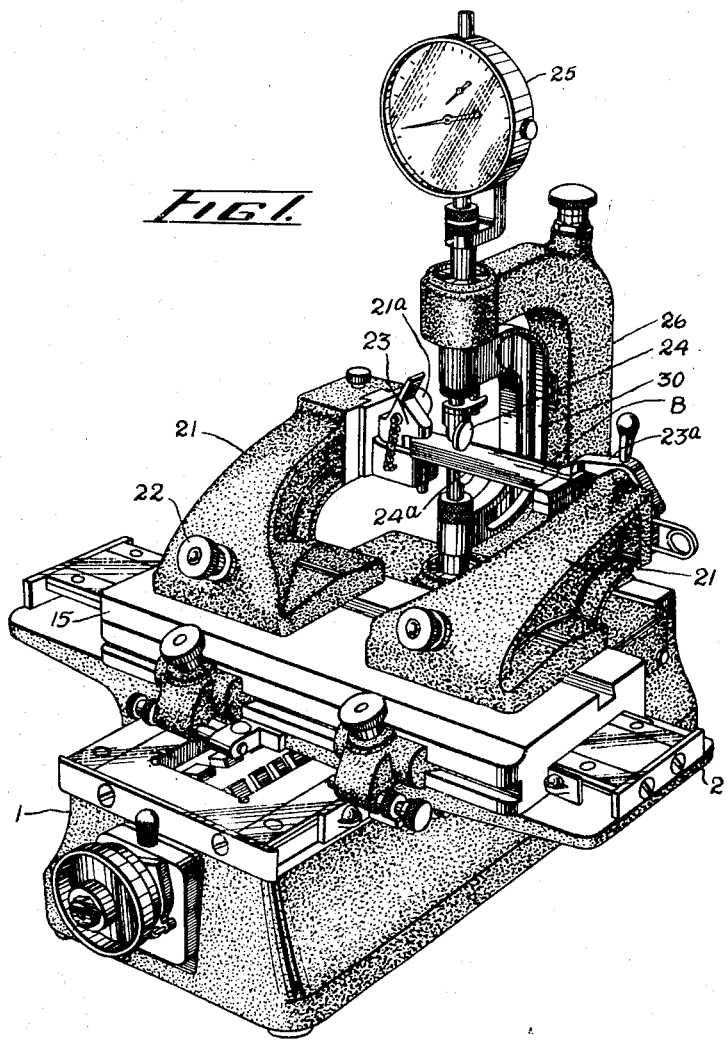
Fig. 1 is a perspective view of an apparatus particularly adapted to gauge the compressor blades of a gas turbine engine.

By reference to Fig. 1 it will be seen that the apparatus comprises a base 1 on which is mounted a carriage 2 which is slidable longitudinally of the apparatus. The location of the carriage 2 in relation to the base is determined by mechanism described in parent application Ser. No. 231,136, Patent 2,714,765.

A table 15 is mounted on carriage 2 and is slidable transversely of the apparatus. Means described in said application which do not form part of this invention, are provided for adjustably positioning the table 15 relative to the carriage 2.

The upper surface of the table 15 is an acurately machined, smooth surface on which is mounted a pair of support brackets 21, 21 which are adjustable in the transverse direction on the table 15 and can be locked in any desired position by actuation of the knobs 22, 22. The datum face 21ª is provided on the left hand support bracket 21 to facilitate the setting of the instrument.

Mounted on the inside faces of the upper ends of the support brackets 21, 21 are suitable, quickly releasable holders or chucks 23, 23ª which are designed to support the blade B to be gauged and provided with suitable bores, V-grooves or the like, adapted to coact with corresponding bosses formed on the tips and the roots of the blades for the accurate and consistent location of each blade in the said holders or chucks 23, 23ª.

As illustrated in Fig. 1, a compressor blade B mounted in the holders or chucks 23, 23ª is adapted to be moved, by longitudinal displacement of the carriage 2 and transverse displacement of the table 15, between an upper feeler wheel 24 and an anvil or lower feeler wheel 24ª. The feeler wheels control a dial-type indicator 25, which in this apparatus, reads to .0001 of an inch.

Figure 2:
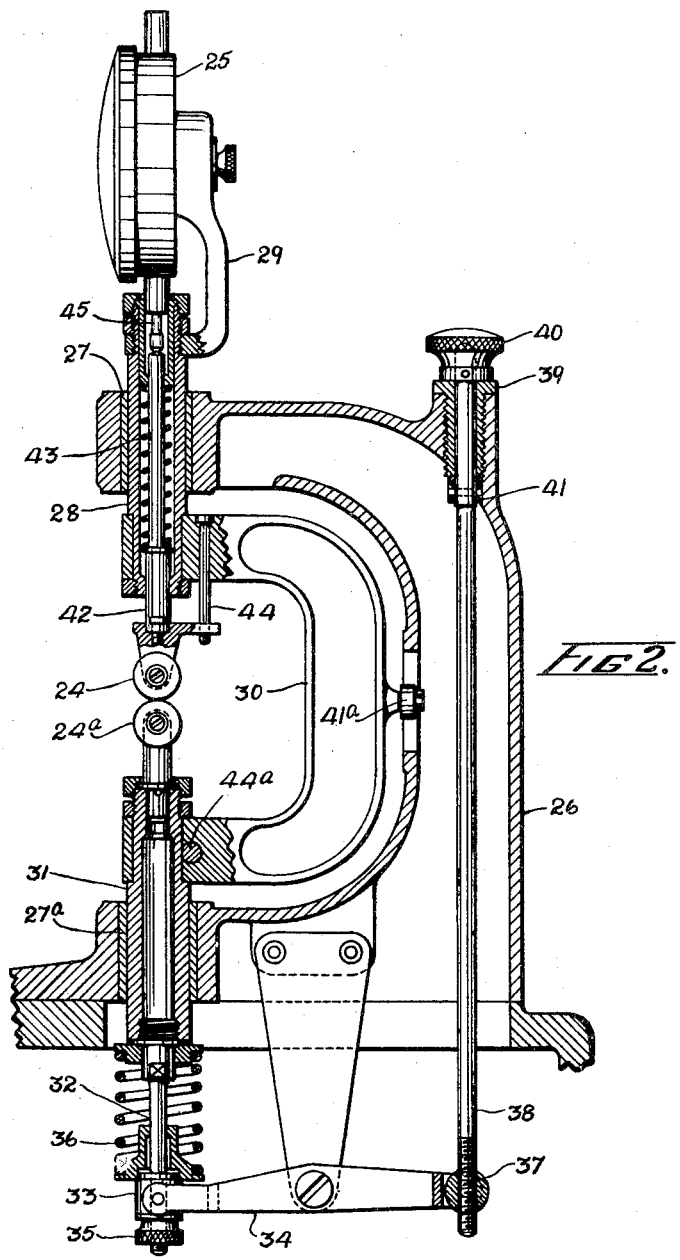
Fig. 2 is a sectional view of the indicator gauge used in the apparatus.

The mounting and actuating mechanism for the indicator 25 is shown more clearly, in section, in Fig. 2. This mechanism comprises a pedestal 26 which is secured to an accurately machined face at the rear of the base 1. The pedestal 26 consists of a hollow C-shaped casting, each arm of which is substantially horizontal and is formed at the end with a boss. Coaxial, vertical bores are machined in the said bosses and the said bores are bushed to form linear upper and lower bearings 27, 27ª. Slidably mounted in the upper linear bearing 27 is a tubular spindle 28 which, at its upper end, supports the frame bracket 29 of the indicator 25 and, at its lower end, is rigidly secured to the upper arm of a C-shaped frame 30 shaped to fit within the curve of the C-shaped pedestal 26. Slidably mounted in the linear bearing 27ª of the lower arm of the pedestal 26 is a spindle 31 rigidly connected at its upper end to the lower arm of the C-shaped frame 30 and having a tension rod 32 screwed into a tapped bore in its lower end.

The lower end of the tension rod 32 is screw-threaded and extends freely through a support sleeve 33 which is trunnioned in one of the forked ends of an equalizer lever 34. A knurled adjusting knob 35 is adapted to screw on the end of the tension rod 32 and bears against the lower face of the support sleeve 33. A helical compression spring 36 is mounted concentrically about the tension rod 32 and bears, through the intermediary of suitable spring retainers, at its upper end against the lower end face of the spindle 31 and at its lower end against the upper end face of the support sleeve 33. The equalizer lever 34 is pivotally mounted adjacent the centre point thereof, and the other forked end of the said equalizer lever supports a trunnioned cylindrical nut member 37, into which screws the threaded lower end of an adjusting rod 38. The upper end of the adjusting rod 38 extends through and is rotatably mounted in a sleeve 39, screwing into a tapped boss cast on the upper surface of the pedestal 26. The adjusting rod 38 is prevented from axial displacement by a knurled knob 40 and a stop sleeve 41 pinned thereto at opposite ends of the sleeve 39. It will be realized that the construction is such that rotation in one direction or the other of the knob 40, will cause the C-shaped frame 30 carrying the indicator 25 to be raised or lowered. Rotation of the C-shaped frame 30 about the common axis of the spindle 28 and the spindle 31 is prevented by means of a small bearing 41ª mounted on the C-shaped frame 30 and adapted to slide in a corresponding, closely fitting, longitudinal slot formed in the pedestal 26.

The anvil or lower feeler wheel 24ª of the gauge is mounted at the upper end of the spindle 31; whilst the upper feeler wheel 24 is carried directly above the said anvil by the lower end of a plunger 42 slidably mounted within the tubular spindle 28. The plunger 42 is subject to the downward pressure of a concentrically arranged helical spring 43 which maintains the desired peripheral contact of the feeler wheel 24. In this position of the feeler wheels 24, 24ª, the upper end of the plunger 42 just contacts the lower end of the actuating rod 45 of the indicator 25 and the instrument is adjusted to read zero. The upper feeler wheel 24 is maintained in the same vertical plane parallel to the longitudinal axis of the apparatus as the lower feeler wheel 24ª, by means of a guide pin 44 mounted in a suitable bore formed vertically in the upper end of the C-shaped frame 30. The lower feeler wheel 24ª is constrained against rotation by a cotter pin 44ª which frictionally engages the spindle 31. The wheels 24, 24ª are replaceable by others of different shape and size.

It should now be clear that the thickness of a specimen introduced between the feeler wheels 24, 24ª will be measured by the indicator 25 if the blade is in proper contact with the lower fixed feeler wheel 24ª. To ensure that this is the case when the blade is mounted in the holders or chucks 23, 23ª carried by the support brackets 21, the height of the C-shaped frame 30 is adjusted by actuation of the knurled knob 40. Since the upward drive of the lower feeler wheel 24ª is transmitted by way of the spring 36, the pressure of which is adjustable by the knob 35, the lower feeler wheel 24ª only bears with a predetermined, light pressure on the underside of the blade. A constant reading on the indicator dial 25 during rotation of the knob 40 indicates that the lower feeler wheel 24ª is in contact with the blade.

Figure 3:
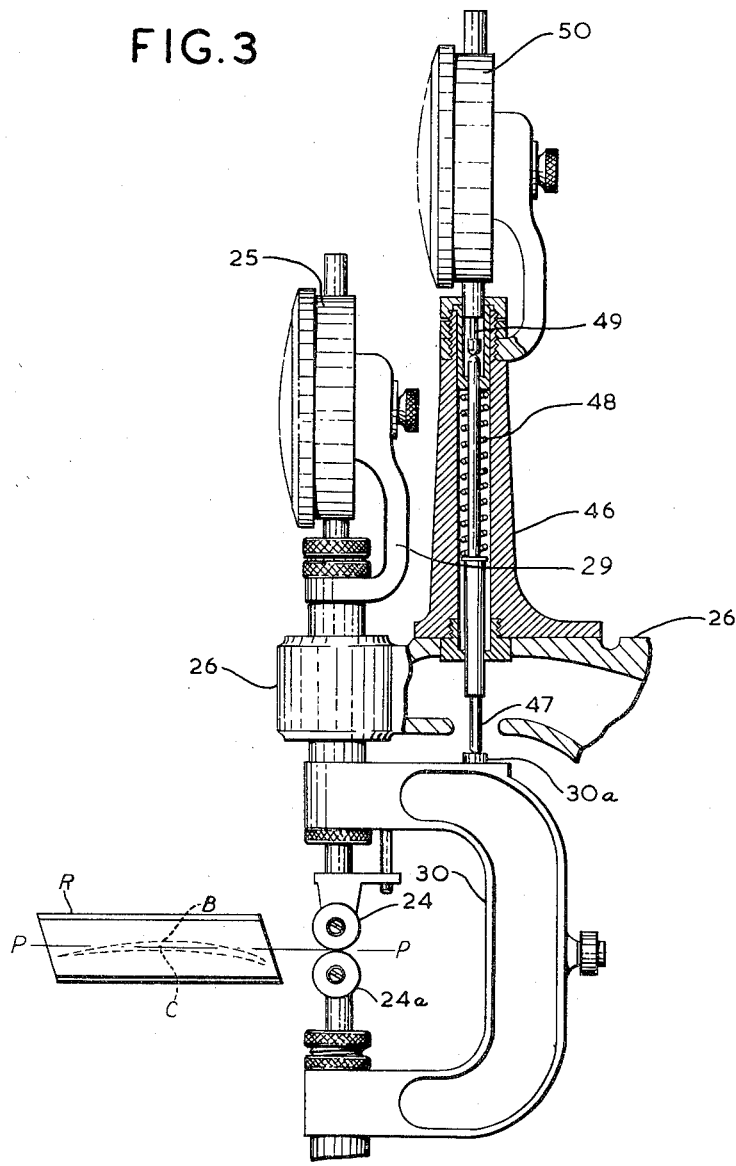
Fig. 3 is a side view partly in section of a modified form of the invention utilizing two indicator gauges. Like reference numerals in the several drawings refer to corresponding parts.

Referring now to Figure 3, by incorporating an additional indicator in the apparatus, the relationship between the blade surfaces and its root can be checked.

A hollow pedestal 46 is mounted on pedestal 26 above the C-frame 30. A pin 47 is slidable in pedestal 46 and extends through apertures in the pedestal 26 to engage boss 30ª on upper surface of C-frame 30. Spring 48 tends to retain pin 47 in contact with boss 30ª. At its upper end the pin 47 just contacts the lower end of actuating rod 49 of the indicator 50.

In Figure 3, by way of example a specimen compressor blade B is shown in position prior to gauging. The root R of this blade is held by chuck 23ª and the end of the blade is held by chuck 23. The dotted line P—P shows the longitudinal plane passing through the centre of mass C. Line P—P is commonly called the "stacking line" of the blade and usually coincides with the centre line of the root of the blade, but the centre line of the root may be offset but parallel to the blade stacking line, or may have an angular relationship thereto, or both. The root centre line bears a known relating dimension to the surface of the root and the chuck 23ª holds the root in optimum position. Since the feeler wheel 24ª will follow the under surface of the specimen and is secured to an moves with the C-frame 30, it will be obvious that frame 30 will move up and down relative to the centre line as the specimen is gauged and that this movement will be transmitted to pin 47 and will be indicated on gauge 50.

The instrument is adjusted to read zero when the lower feeler wheel 24ª is in contact with the reference plane of a test bar or "set-up" bar held by the workpiece holders or chucks 23-23ª. The test bar is provided with locating surfaces that represent those of the workpiece to be checked. The test bar is also provided with a plane surface that represents plane P—P.

Alternatively the instrument may be adjusted to read zero on gauge 50 by means of a master blade or one having known dimensions. In this case the distance is known between the plane P and the point of tangency of the blade, i. e. the distance between the highest point of blade camber and the plane P measured in a vertical line. This distance can be adjusted for when setting the gauge at zero.

The invention is not limited to movement of the part to be gauged in the horizontal plane as described with reference to the construction illustrated in the drawings, nor need the axis of the gauge mechanism be vertical, but various changes in the arrangement and construction of the apparatus may be effected without exceeding the scope of the invention.

What we claim as our invention is:

1. Gauge apparatus comprising a gauge device having a fixed anvil and an opposed displaceable feeler, a holder for supporting an object to be gauged between the said anvil and feeler, means enabling the said gauge device and the said holder to be relatively displaced in two angularly related directions, stop means for the location of the said gauge device and holder in several predetermined relative positions, and resilient means for constantly urging the said gauge device to maintain the said anvil in contact with one of the sides of the said object.

2. Gauge apparatus comprising a base, a gauge device having a fixed anvil and an opposed displaceable feeler, a mounting on the said base for the said gauge device adapted to enable displacement of the said gauge device, resilient means for positioning the said gauge device relatively to the said mounting, a holder mounted on the said base for supporting an object to be gauged between the said anvil and feeler, and means enabling the said gauge device and the said holder to be relatively displaced in two angularly related directions.

3. Gauge apparatus comprising a base, a gauge device having a fixed anvil and an opposed displaceable feeler, a mounting on the said base for the said gauge device, a holder mounted on the said base for supporting an object to be gauged between the said anvil and feeler, adjusting means incorporating a resilient element for the displacement of the said gauge device on the said mounting to cause the said anvil to bear against one of the sides of the said object, and means enabling the said gauge device and the said holder to be relatively displaced in two angularly related directions.

4. Gauge apparatus comprising a base, a gauge device having a fixed anvil and an opposed displaceable feeler, a mounting on the said base for the said gauge device, a table displaceably mounted in two angularly related directions on the said base, a holder for supporting an object to be gauged between the said anvil and feeler carried by the said table, means adapted to enable displacement of the said gauge device on the said mounting in a direction substantially normal to one of the sides of the said object, and resilient means for urging the said gauge device to press the said anvil into contact with one of the sides of the said object.

5. Gauge apparatus, comprising a base, a gauge device having a fixed anvil and an opposed displaceable feeler, a mounting on the said base for the said gauge device, a table slidably mounted on the base, a holder for supporting an object to be gauged between said anvil and feeler carried by said table, means to enable displacement of said gauge device on said mounting in a direction substantially normal to one of the sides of the said object, resilient means for urging the said gauge device to press said anvil into contact with one of the sides of the said object, and a slotted locking member and coacting lug, one of which is carried by said table and the other by said base for locating said table in several predetermined positions relative to the base.

6. Gauge apparatus comprising a gauge device having a fixed anvil and an opposed displaceable feeler, a holder for supporting an object to be gauged between the said anvil and feeler, means enabling the said gauge device and the said holder to be relatively displaced in two angularly related directions, resilient means for constantly urging the said gauge device to maintain the said anvil in contact with one of the sides of the said object, and means for indicating the position of said anvil relative to the centre plane of the article to be gauged.

7. Gauge apparatus comprising a gauge device having a fixed anvil and an opposed displaceable feeler, a holder for supporting an object to be gauged between the said anvil and feeler, means enabling the said gauge device and the said holder to be relatively displaced in two angularly related directions, resilient means for constantly urging the said gauge device to maintain the said anvil in contact with one of the sides of the said object, and means engaging the gauge device and actuated by movement thereof to indicate the position of the anvil relative to centre plane of the article to be gauged.

8. Gauge apparatus comprising a gauge device having a fixed anvil and an opposed displaceable feeler, a holder for supporting an object to be gauged between the said anvil and feeler, means enabling the said gauge device and the said holder to be relatively displaced in two angularly related directions, a mounting for the said gauge device adapted to enable displacement of the gauge device, resilient means for constantly urging the said gauge device to maintain the said anvil in contact with one of the sides of the said object, a spring pressed pin slidably mounted on the mounting, said pin engaging a portion of the gauge device and slidable relative to the mounting by movement of the gauge device, and a gauge actuated by the pin to indicate the position of the anvil relative to the centre plane of the article to be gauged.

References Cited in the file of this patent

UNITED STATES PATENTS

| | | |
|---|---|---|
| 2,370,220 | Aller et al. | Feb. 27, 1945 |
| 2,714,765 | Creek et al. | Aug. 9, 1955 |